(12) United States Patent
Okura et al.

(10) Patent No.: US 8,552,116 B2
(45) Date of Patent: Oct. 8, 2013

(54) POLYPROPYLENE RESIN, POLYPROPYLENE RESIN COMPOSITION, AND FOAM-INJECTION-MOLDED ARTICLE

(75) Inventors: Tetsuo Okura, Settsu (JP); Terumasa Abe, Settsu (JP); Ryoji Nakayama, Settsu (JP)

(73) Assignee: Kaneka Corporation, Osaka-shi (JP)

( * ) Notice: Subject to any disclaimer, the term of this patent is extended or adjusted under 35 U.S.C. 154(b) by 0 days.

(21) Appl. No.: 13/501,193

(22) PCT Filed: Oct. 12, 2010

(86) PCT No.: PCT/JP2010/067850
§ 371 (c)(1),
(2), (4) Date: Jun. 27, 2012

(87) PCT Pub. No.: WO2011/046103
PCT Pub. Date: Apr. 21, 2011

(65) Prior Publication Data
US 2012/0264886 A1    Oct. 18, 2012

(30) Foreign Application Priority Data

| Oct. 13, 2009 | (JP) | 2009-235987 |
| Jan. 8, 2010 | (JP) | 2010-003239 |
| Apr. 14, 2010 | (JP) | 2010-092799 |
| Jun. 29, 2010 | (JP) | 2010-147306 |

(51) Int. Cl.
*C08F 8/00* (2006.01)
*C08L 23/00* (2006.01)
*C08L 23/04* (2006.01)
*C08L 23/10* (2006.01)

(52) U.S. Cl.
USPC ............................. 525/193; 525/194; 525/240

(58) Field of Classification Search
USPC .......................................... 525/193, 194, 240
See application file for complete search history.

(56) References Cited

U.S. PATENT DOCUMENTS

| 7,423,071 B2 * | 9/2008 | Mogami et al. ............... 521/142 |
| 2007/0032600 A1 | 2/2007 | Mogami et al. |
| 2010/0152386 A1 | 6/2010 | Miwa et al. |

FOREIGN PATENT DOCUMENTS

| CN | 1845964 A | 10/2006 |
| EP | 0874009 A1 | 10/1998 |
| EP | 1666530 A1 | 6/2006 |
| JP | 61-152754 A | 7/1986 |
| JP | 07-109372 A | 4/1995 |
| JP | 09-188774 A | 7/1997 |
| JP | 09-309967 A | 12/1997 |
| JP | 2001-226510 A | 8/2001 |
| JP | 2007-245450 A | 9/2007 |
| JP | 2008-101060 A | 5/2008 |
| JP | 2008-274024 A | 11/2008 |
| JP | 2009-001772 A | 1/2009 |
| JP | 2009-29900 A | 2/2009 |
| WO | 2005/026255 A1 | 3/2005 |
| WO | 2008/146739 A1 | 4/2008 |
| WO | 2009/060792 A1 | 5/2009 |

OTHER PUBLICATIONS

Machine translation and Abstract of WO2005-026255; Original document previously submitted in IDS filed Apr. 10, 2012.
Machine translation and Abstract of JP2009-001772; Original document previously submitted in IDS filed Apr. 10, 2012.
Machine translation and Abstract of JP2008-101060; Original document previously submitted in IDS filed Apr. 10, 2012.
Machine translation and Abstract of JP09-309967; Original document previously submitted in IDS filed Apr. 10, 2012.
Machine translation and Abstract of JP2008-274024; Original document previously submitted in IDS filed Apr. 10, 2012.
Machine translation and Abstract of JP2009-029900; Original document previously submitted in IDS filed Apr. 10, 2012.
Machine translation and Abstract of JP2007-245450; Original document previously submitted in IDS filed Apr. 10, 2012.
Machine translation and Abstract of WO2009-060792; Original document previously submitted in IDS filed Apr. 10, 2012.
Machine translation and Abstract of JP2001-226510; Original document previously submitted in IDS filed Apr. 10, 2012.
Machine translation and Abstract of JP09-188774; Original document previously submitted in IDS filed Apr. 10, 2012.
Machine translation and Abstract of JP07-109372; Original document previously submitted in IDS filed Apr. 10, 2012.
Abstract of JP61-152754; Original document previously submitted in IDS filed Apr. 10, 2012.
International Preliminary Report on Patentability (Form PCT/IB/373) of International Application No. PCT/JP2010/067850 mailed May 15, 2012 with Forms PCT/ISA/237.
International Search Report of PCT/JP2010/067850, dated Jan. 18, 2011.

* cited by examiner

*Primary Examiner* — Nathan M Nutter
(74) *Attorney, Agent, or Firm* — Westerman, Hattori, Daniels & Adrian, LLP

(57) ABSTRACT

A polypropylene resin and a polypropylene resin composition are provided, which have excellent fluidity and foaming properties, and particularly in use for foam injection molding, allow molding with a narrow initial cavity clearance even if a large mold is used, and therefore can provide a thin, large-area foam-injection-molded article having good appearance. The invention relates to a polypropylene resin obtained by melt mixing a linear polypropylene resin, a radical polymerization initiator and a conjugated diene compound, wherein the polypropylene resin has a melt flow rate of more than 30 g/10 min and not more than 250 g/10 min as measured at 230° C. under a load of 2.16 kg; a melt tension at 200° C. of not less than 0.3 cN; and a loss tangent (tan δ) of not more than 6.0, the loss tangent being a ratio of loss modulus to storage modulus at an angular frequency of 1 rad/s in dynamic viscoelasticity measurement at 200° C., and also relates to a polypropylene resin composition for foam injection molding, containing the polypropylene resin.

15 Claims, No Drawings

POLYPROPYLENE RESIN, POLYPROPYLENE RESIN COMPOSITION, AND FOAM-INJECTION-MOLDED ARTICLE

TECHNICAL FIELD

The present invention relates to a polypropylene resin that can be suitably used for foam injection molding, a polypropylene resin composition, and a foam-injection-molded article.

BACKGROUND ART

Polypropylene resins have high physical properties and moldability, and are an eco-friendly material. For this reason, use of the polypropylene resins has been rapidly spread over a wide range. Particularly, in automobile parts and the like, polypropylene resin products having a light weight and high rigidity are applied. One of such products is foam-injection-molded articles of polypropylene resin.

Examples of the polypropylene resin foamed articles include those obtained by melt mixing a mixture of a polypropylene resin and a foaming agent and extruding it under atmospheric pressure in an extruder to form an extrusion foamed sheet, and then sandwiching the sheet between molds to form a molded article; and those obtained by filling polypropylene resin pre-foamed particles into a mold having a desired shape and heating them by steam or the like to fuse the pre-foamed particles into a molded article. The polypropylene resin foamed articles are used in various applications because of their light weight.

Regarding the foam-injection-molded articles of polypropylene resin, examples of a technique of highly foaming a polypropylene resin include the so-called core-back method (moving cavity method) in which a resin containing a foaming agent is injected into a cavity of a mold held such that the mold can be opened, and the mold is opened to extend the cavity, thereby foaming the resin (for example, see Patent Document 1).

Usually, as properties of the polypropylene resin used for foam injection molding, fluidity for fully filling the resin into the mold and foaming properties for foaming the resin after filling are required. For example, in the case where the foam-injection-molded article of polypropylene resin constitutes, in particular, a large molded product such as an automobile part such as a console box, a baggage box, a door trim, and a tool box, the molded article is required to be lightweight, thick, and highly rigid. In this case, the fluidity of a raw material resin to be used needs to be increased because molding defects such as short shots in molding are likely to occur.

Moreover, linear polypropylene resins usually used are crystalline and have small melt tension, which easily causes breakage of cells. Thus it is difficult to highly foam the linear polypropylene resin. As a result, appearance defects called silver streaks due to the gas produced by the foaming agent are likely to appear on the surface of the foam-injection-molded article, and voids are also likely to appear within the article. For this reason, it is difficult to increase the expansion ratio.

As a method for increasing the melt tension of polypropylene resins, for example, a method in which a crosslinking agent or a silane-grafted thermoplastic resin is added (Patent Documents 2 and 3), a method in which a non-crosslinked polypropylene resin is irradiated with radiation to introduce long-chain branches (Patent Document 4), and a method in which a polypropylene resin, isoprene monomer, and a radical polymerization initiator are melt kneaded to produce a modified polypropylene resin (Patent Document 5) have been proposed. To be sure, by these methods, a foam-injection-molded article with high expansion ratio is obtained; however, the viscosity during melting of the resin is excessively increased, leading to difficulties in injection molding. Moreover, flow marks, molding defects that are presumably attributed to imparting foaming properties, may appear, resulting in poor surface appearance of the article.

Meanwhile, as a method for improving moldability in foam injection molding, for example, a method has been proposed in which a linear polypropylene resin is used in combination with a polypropylene resin having a melt flow rate of less than 30 g/10 min and a melt tension of not less than 5 cN (Patent Documents 6 and 8). The method can improve the fluidity, and enables foam injection molding without short shots even when a relatively large mold is used. Nevertheless, this method may provide insufficient fluidity in the case of foam injection molding using a large mold such as those having a projected area of more than 0.2 $m^2$.

Alternatively, a method using a polyolefin wax together has been proposed (Patent Document 9). This method further improves the fluidity; however, the use of wax may reduce physical properties (impact resistance) of the molded article. Particularly, in the case where a thin foam-injection-molded article is produced at a high expansion ratio of, for example, more than 2 times, an initial cavity clearance needs to be small, which may result in short shots in foam injection molding using a large mold. The melt tension is also largely influenced by the melt flow rate. The melt tension tends to be higher as the melt flow rate is lower. Accordingly, in a polypropylene resin having high fluidity in which the melt flow rate is, for example, more than 30 g/10 min, the specified value of the melt tension of not less than 5 cN is insufficient as an index of good foaming properties.

Meanwhile, for example, a method in which a polypropylene resin whose melt tension and loss tangent are specified is used for extrusion foaming (Patent Document 7) has been proposed. The resin used in this method has a low melt flow rate and is suitable for extrusion foaming, but not suitable for foam injection molding.

As described above, it is difficult to provide a polypropylene resin that is for use in foam injection molding using a large mold and has both better fluidity and better foaming properties, as well as measures against the appearance defects mentioned above.

Patent Document 1: WO 2005/026255
Patent Document 2: JP S61-152754 A
Patent Document 3: JP H07-109372 A
Patent Document 4: JP 2001-226510 A
Patent Document 5: JP H09-188774 A
Patent Document 6: WO 2009/060792
Patent Document 7: JP 2009-29900 A
Patent Document 8: WO 2005/026255
Patent Document 9: JP 2008-101060 A

SUMMARY OF THE INVENTION

An object of the present invention is to provide a polypropylene resin, a polypropylene resin composition, and a material for foam injection molding which includes the resin or resin composition, each of which has excellent fluidity and foaming properties, and small resistance during extrusion or injection (small increase in pressure) to provide a foam-injection-molded article having good surface appearance. Particularly, an object of the present invention is to provide a polypropylene resin, a polypropylene resin composition, and a material for foam injection molding which includes the resin or resin composition, each of which enables a thin foam-injection-molded article to be produced using a large mold whose projected area is not less than 0.2 m², and provides a foam-injection-molded article having good surface appearance with little silver streaks and flow marks and also having high impact resistance.

As a result of extensive research, the present inventors have found out that the problems can be solved by a polypropylene resin obtained by melt mixing a linear polypropylene resin, a radical polymerization initiator, and a conjugated diene compound, wherein the polypropylene resin has a melt flow rate of more than 30 g/10 min and not more than 250 g/10 min as measured at 230° C. under a load of 2.16 kg; a melt tension at 200° C. of not less than 0.3 cN; and a loss tangent, tan δ, of not more than 6.0, the loss tangent being a ratio of loss modulus to storage modulus at an angular frequency of 1 rad/s in dynamic viscoelasticity measurement at 200° C. Thus, the present invention has been completed.

Namely, the present invention relates to a polypropylene resin, obtained by melt mixing a linear polypropylene resin, a radical polymerization initiator and a conjugated diene compound, wherein the polypropylene resin has a melt flow rate of more than 30 g/10 min and not more than 250 g/10 min as measured at 230° C. under a load of 2.16 kg; a melt tension at 200° C. of not less than 0.3 cN; and a loss tangent, tan δ, of not more than 6.0, the loss tangent being a ratio of loss modulus to storage modulus at an angular frequency of 1 rad/s in dynamic viscoelasticity measurement at 200° C.

The melt flow rate is preferably more than 50 g/10 min and not more than 250 g/10 min.

The amount of the radical polymerization initiator added is preferably not less than the amount of the conjugated diene compound added.

More preferably, the amount of the radical polymerization initiator added is not less than 1.5 times the amount of the conjugated diene compound added.

The present invention also relates to a polypropylene resin composition for foam injection molding, containing 3 to 50% by weight of the polypropylene resin (A), and 50 to 97% by weight of a linear polypropylene resin (B) having a melt flow rate at 230° C. of not less than 10 g/10 min and not more than 150 g/10 min and a melt tension of less than 2 cN.

The linear polypropylene resin (B) preferably has a Charpy impact strength at 23° C. of not less than 5 kJ/m².

Further, the present invention relates to a foam-injection-molded article, produced by foam injection molding a composition including the polypropylene resin or polypropylene resin composition, and a foaming agent.

The polypropylene resin and polypropylene resin composition according to the present invention have excellent fluidity and foaming properties. For this reason, they can be particularly suitably used for foam injection molding, and especially enable a thin foam-injection-molded article to be produced using a large mold. Further, the polypropylene resin and polypropylene resin composition according to the present invention have a melt flow rate of more than 30 g/10 min and are highly fluid, and can be greatly deformed by a small expansion force. Accordingly, they provide a foam-injection-molded article having a desired expansion ratio even if the amount of the foaming agent is reduced, compared to the conventional polypropylene resin and polypropylene resin composition which have a melt flow rate of not more than 30 g/10 min.

The foam-injection-molded article obtained from the polypropylene resin or polypropylene resin composition according to the present invention has an high expansion ratio with little silver streaks and flow marks and exhibits good surface appearance. If a linear polypropylene having a small melt elasticity and a Charpy impact strength at 23° C. of not less than 5 kJ/m² is used together, a foam-injection-molded article having high impact resistance is obtained.

BEST MODE FOR CARRYING OUT THE INVENTION

Hereinafter, embodiments according to the present invention will be described.

The polypropylene resin (A) according to the present invention is obtained by melt mixing a linear polypropylene resin, a radical polymerization initiator, and a conjugated diene compound, and the polypropylene resin (A) characteristically has a melt flow rate of more than 30 g/10 min and not more than 250 g/10 min as measured at 230° C. under a load of 2.16 kg; a melt tension at 200° C. of not less than 0.3 cN; and a loss tangent (tan δ) of not more than 6.0, the loss tangent being a ratio of loss modulus to storage modulus at an angular frequency of 1 rad/s in dynamic viscoelasticity measurement at 200° C.

Regarding the melt flow rate of the polypropylene resin (A), the lower limit is more than 30 g/10 min, and preferably more than 50 g/10 min, and the upper limit is not more than 250 g/10 min, and preferably not more than 100 g/10 min. At a melt flow rate of not more than 30 g/10 min, the fluidity may be insufficient, causing short shots in foam injection molding using a large mold. At a melt flow rate more than 250 g/10 min, the weighing step in foam injection molding may be unstably carried out.

As used herein, the melt flow rate (hereinafter, abbreviated to "MFR" in some cases) refers to the value calculated as follows: using a Melt Indexer S-01 (manufactured by Toyo Seiki Seisaku-sho, Ltd.) in accordance with ASTM D-1238, the amount of resin extruded from a die for a predetermined period of time at 230° C. under a load of 2.16 kg is measured and used to calculate an amount of resin extruded for 10 minutes. Here, the predetermined period of time is for 60 seconds at a melt flow rate of not less than 3.5 g/10 min and less than 10 g/10 min; for 30 seconds at a melt flow rate of not less than 10 g/10 min and less than 25 g/10 min; for 15 seconds at a melt flow rate of not less than 25 g/10 min and less than 50 g/10 min; for 5 seconds at a melt flow rate of not less than 50 g/10 min and less than 100 g/10 min; for 3 seconds at a melt flow rate of not less than 100 g/10 min. If the melt flow rate as measured for a certain number of seconds is not in the corresponding range, measurement is again performed for the number of seconds corresponding to the melt flow rate.

The polypropylene resin (A) has a melt tension at 200° C. of not less than 0.3 cN, preferably not less than 0.5 cN, more preferably not less than 0.8 cN, still more preferably not less than 1.0 cN, and most preferably not less than 1.05 cN. The upper limit of the melt tension is not particularly limited, and is preferably not more than 15 cN, and more preferably not more than 10 cN. If the polypropylene resin with a melt flow rate more than 30 g/10 min has a melt tension less than 0.3 cN, breakage of cells at the flow front of the molten resin during foam injection molding may not be prevented, thereby causing silver streaks, so that the resulting foam-injection-molded article has poor surface appearance. On the other hand, at a melt tension more than 15 cN, mixability with the linear polypropylene resin (B) described later may be reduced, leading to poor surface appearance.

As used herein, the melt tension (hereinafter, abbreviated to "MT" in some cases) refers to the load measured as follows: using a Capirograph (manufactured by Toyo Seiki Seisaku-sho, Ltd.) which includes a φ10 mm cylinder having an end with a φ1 mm orifice having a length of 10 mm and is equipped with an attachment for melt tension measurement, a strand discharged from a die when a piston is fallen at 200° C. and a piston fall speed of 10 mm/min, is connected to a pulley with a load cell located 350 mm below, and taken up at a speed of 1 m/min by the pulley; after the strand state is stabilized, the take-up speed is increased at a rate of 40 m/min$^2$; and a load applied to the pulley with a load cell when the strand is broken, is measured. In the case where the strand cannot be broken, a load at which the load applied the pulley with a load cell is no longer increased by increasing the take-up speed, is regarded as the melt tension.

The polypropylene resin has a loss tangent (tan δ) of not more than 6.0, and preferably not more than 5.0, the loss tangent being a ratio of loss modulus to storage modulus at an angular frequency of 1 rad/s in dynamic viscoelasticity measurement at 200° C.

Here, the angular frequency of 1 rad/s is in the so-called low shear range. It is thought that if in this range, the loss tangent (tan δ) is small, namely, the storage modulus is relatively large, this is advantageous in keeping cells during foaming. However, in the case of a relatively higher molecular weight polypropylene resin having a melt flow rate of not more than 30 g/10 min, large proportion of molecular chains are entangled with each other and as the melt flow rate is smaller, the loss tangent (tan δ) tends to be measured smaller. However, if the loss tangent (tan δ) is small due to the low melt flow rate, it cannot be said that the loss tangent (tan δ) properly indicates the melt properties suited for foaming. In fact, such a loss tangent (tan δ) is not always sufficient for keeping cells in foam injection molding. That is, in the present invention, a small loss tangent (tan δ) in a highly fluid polypropylene resin having a melt flow rate more than 30 g/10 min can be regarded as an index for keeping cells in foam injection molding. At a loss tangent (tan δ) more than 6.0, breakage of cells is more likely to occur, so that voids within the foam-injection-molded article may appear, or the thickness of the foam-injection-molded article may be undesirably reduced.

Meanwhile, the lower limit of the loss tangent (tan δ) is not particularly limited, and is preferably not less than 0.7, and more preferably not less than 0.9. At a loss tangent (tan δ) less than 0.7, flow marks, which are a circular pattern concentrically formed around the gate site, may remarkably appear on the surface of the foam-injection-molded article, leading to poor surface appearance.

Here, the loss tangent (tan δ) is calculated as follows: using a viscoelasticity measuring apparatus installed with a φ25 mm parallel plate fixture, measurement is performed at a measurement temperature of 200° C., a parallel plate gap of 1 mm, and an angular frequency in the range of 0.1 rad/s to 100 rad/s; and based on the measured values of the storage modulus and loss modulus at an angular frequency of 1 rad/s, the loss tangent (tan δ) is calculated by dividing the loss modulus by the storage modulus. In the viscoelasticity measurement, for example, a viscoelasticity measuring apparatus ARES manufactured by TA Instruments may be suitably used.

The polypropylene resin (A) having the physical properties mentioned above is obtained by a method of melt mixing a linear polypropylene resin, a radical polymerization initiator and a conjugated diene compound, and contains a branched structure or a high molecular weight component. The method is advantageous because no expensive facility is needed and the polypropylene resin can be produced at low cost.

Examples of the conjugated diene compound used to obtain the polypropylene resin (A) include butadiene, isoprene, 1,3-heptadiene, 2,3-dimethylbutadiene, and 2,5-dimethyl-2,4-hexadiene. These may be used alone, or may be used in combination. Among these, butadiene and isoprene are particularly preferred because these are inexpensive and easy to handle, and lead to a more uniform reaction.

The amount of the conjugated diene compound added is preferably not less than 0.01 parts by weight and not more than 5 parts by weight, and more preferably not less than 0.05 parts by weight and not more than 2 parts by weight based on 100 parts by weight of the linear polypropylene resin. If the amount of the conjugated diene compound added is less than 0.01 parts by weight, the loss tangent (tan δ) may exceed 6.0, leading to insufficient foaming properties. At an amount more than 5 parts by weight, the melt flow rate may be not more than 30 g/10 min, leading to insufficient fluidity.

In the present invention, a monomer copolymerizable with the conjugated diene compound (for example, vinyl chloride, vinylidene chloride, acrylonitrile, methacrylonitrile, acrylamide, methacrylamide, vinyl acetate, acrylic acid, methacrylic acid, maleic acid, maleic anhydride, acrylic acid metal salts, methacrylic acid metal salts, acrylic acid esters such as methyl acrylate, ethyl acrylate, butyl acrylate, 2-ethylhexyl acrylate, and stearyl acrylate, and methacrylic acid esters such as methyl methacrylate, ethyl methacrylate, butyl methacrylate, 2-ethylhexyl methacrylate, and stearyl methacrylate) may be used in combination.

Examples of the radical polymerization initiator used to obtain the polypropylene resin (A) typically include peroxides and azo compounds. Preferred are those having an ability to abstract hydrogen from the polypropylene resin or the conjugated diene compound. Examples thereof include organic peroxides such as ketone peroxides, peroxyketals, hydroperoxides, dialkylperoxides, diacylperoxides, peroxydicarbonates, and peroxyesters.

Among these, particularly preferred are those having a high ability to abstract hydrogen. Examples thereof include peroxyketals such as 1,1-bis(t-butylperoxy)-3,3,5-trimethylcyclohexane, 1,1-bis(t-butylperoxy)cyclohexane, n-butyl-4,4-bis(t-butylperoxy)valerate and 2,2-bis(t-butylperoxy)butane; dialkylperoxides such as dicumyl peroxide, 2,5-dimethyl-2,5-di(t-butylperoxy)hexane, α,α'-bis(t-butylperoxy-m-isopropyl)benzene, t-butylcumyl peroxide, di-t-butyl peroxide, and 2,5-dimethyl-2,5-di(t-butylperoxy)-3-hexyne; diacylperoxides such as benzoyl peroxide; and peroxyesters such as t-butyl peroxyoctoate, t-butyl peroxyisobutyrate, t-butyl peroxylaurate, t-butyl peroxy-3,5,5-trimethylhexanoate, t-butyl peroxyisopropylcarbonate, 2,5-dimethyl-2,5-di(benzoylperoxy)hexane, t-butyl peroxyacetate, t-butyl peroxybenzoate, and di-t-butyl peroxyisophthalate. These may be used alone, or two or more thereof may be used in combination.

The added amount of the radical polymerization initiator used to obtain the polypropylene resin (A) is preferably not less than 0.05 parts by weight and not more than 10 parts by weight, and more preferably not less than 0.2 parts by weight and not more than 5 parts by weight based on 100 parts by weight of the linear polypropylene resin. If the amount of the radical polymerization initiator added is less than 0.05 parts by weight, the loss tangent (tan δ) may be more than 6.0, leading to insufficient foaming properties. At an amount more than 10 parts by weight, the effect of modification may become saturated and uneconomical.

In general, when a linear polypropylene resin is modified to have a loss tangent (tan δ) of not more than 6.0, the melt flow rate tends to be not more than 30 g/10 min. In the present invention, the amount of the radical polymerization initiator added is not less than the amount of the conjugated diene compound added. Thereby, adjustment can be relatively easily performed so that the modified polypropylene resin has a melt flow rate of more than 30 g/10 min, a melt tension of not less than 0.3 cN, and a loss tangent (tan δ) of not more than 6.0. The amount of the radical polymerization initiator added, by weight, is preferably not less than the amount of the conjugated diene compound added, more preferably not less than 1.5 times the amount of the conjugated diene compound added, and still more preferably not less than 2 times the amount of the conjugated diene compound added.

The linear polypropylene resin used to obtain the polypropylene resin (A) is a polypropylene resin having a linear molecular structure, and specific examples thereof include homopolymers, block copolymers, and random copolymers of propylene which are crystalline polymers. From the viewpoint of maintaining the properties of polypropylene resin such as crystallinity, rigidity, and chemical resistance, preferable copolymers of propylene include those containing not less than 75% by weight of propylene.

Examples of an α-olefin copolymerizable with propylene include α-olefins having 2 or 4 to 12 carbon atoms, such as ethylene, 1-butene, isobutene, 1-pentene, 3-methyl-1-butene, 1-hexene, 4-methyl-1-pentene, 3,4-dimethyl-1-butene, 1-heptene, 3-methyl-1-hexene, 1-octene, and 1-decene; cyclic olefins such as cyclopentene, norbornene, and tetracyclo[6,2,11,8,13,6]-4-dodecene; dienes such as 5-methylene-2-norbornene, 5-ethylidene-2-norbornene, 1,4-hexadiene, methyl-1,4-hexadiene, and 7-methyl-1,6-octadiene; and vinyl monomers such as vinyl chloride, vinylidene chloride, acrylonitrile, vinyl acetate, acrylic acid, methacrylic acid, maleic acid, ethyl acrylate, butyl acrylate, methyl methacrylate, maleic anhydride, styrene, methylstyrene, vinyltoluene, and divinylbenzene. These may be used alone, or two or more thereof may be used in combination. Among these, ethylene and 1-butene are preferred because of their improved resistance to low temperature brittleness, their low costs, and the like.

Examples of an apparatus for reacting the linear polypropylene resin, the conjugated diene compound and the radical polymerization initiator to obtain the polypropylene resin (A) include kneaders such as rolls, co-kneaders, Banbury mixers, Brabenders, single screw extruders, and twin screw extruders; horizontal agitators such as twin-screw surface renewal devices and twin screw multi-disk devices; and vertical agitators such as double helical ribbon agitators. Among these, kneaders are preferably used, and extruders are particularly preferred from the viewpoint of productivity.

The order and method for mixing and kneading (agitating) the linear polypropylene resin, the conjugated diene compound and the radical polymerization initiator to obtain the polypropylene resin (A) are not particularly limited. The linear polypropylene resin, the conjugated diene compound and the radical polymerization initiator may be mixed, and then melt kneaded (agitated). Alternatively, the polypropylene resin may be melt kneaded (agitated), and then the conjugated diene compound and the radical polymerization initiator may be simultaneously or separately mixed, either all at once or in portions. The temperature in the kneader (agitator) is preferably 130 to 300° C. because the linear polypropylene resin is molten but not thermally decomposed. A preferable kneading (agitating) time is usually 1 to 60 minutes.

The polypropylene resin (A) according to the present invention can be produced as above. The shape and size of the modified polypropylene resin (A) are not limited, and the resin (A) may be in the form of pellets.

The polypropylene resin composition for foam injection molding according to the present invention contains 3 to 50% by weight of the polypropylene resin (A), and 50 to 97% by weight of a linear polypropylene resin (B) having a melt flow rate at 230° C. of not less than 10 g/10 min and not more than 150 g/10 min and a melt tension of less than 2 cN. Containing a linear polypropylene resin (B) reduces flow marks on the foam-injection-molded article. Further, the use of a resin having high impact strength as the linear polypropylene resin (B) improves impact resistance of the foam-injection-molded article.

The linear polypropylene resin (B) has a melt flow rate of preferably not less than 10 g/10 min and not more than 150 g/10 min, more preferably not less than 10 g/10 min and not more than 100 g/10 min, still more preferably not less than 30 g/10 min and not more than 90 g/10 min, and most preferably not less than 30 g/10 min and not more than 50 g/10 min. The linear polypropylene resin (B) has a melt tension of preferably less than 2 cN, and more preferably not more than 1 cN. If the melt flow rate of the linear polypropylene resin (B) is in the range of not less than 10 g/10 min and not more than 150 g/10 min, in the production of the foam-injection-molded article, the molten resin can be filled into a mold at a relatively low pressure during molding using a mold whose cavity includes a thin portion with a clearance of approximately 1 to 2 mm, and stable foam injection molding tends to be continuously carried out. At a melt tension less than 2 cN, a foam-injection-molded article having beautiful surface appearance without flow marks can be obtained.

Specific examples of the linear polypropylene resin include propylene homopolymers, propylene-ethylene random copolymers, and propylene-ethylene block copolymers. Among these, linear polypropylene resins having a Charpy impact strength at 23° C. of not less than 5 kJ/m$^2$ are preferably used from the viewpoint of easiness to impart impact resistance to the foam-injection-molded article.

As used herein, the Charpy impact strength refers to the value calculated as follows: using a Charpy impact tester (manufactured by Toyo Seiki Seisaku-sho, Ltd.) in accordance with JIS K7111, a notched prismatic specimen is subjected to impact at a high speed to break the specimen, and the impact energy absorbed in breaking the specimen is divided by the original cross section area of the specimen.

Regarding the mixture ratio of the polypropylene resin (A) and the linear polypropylene resin (B), given that the total of the resins is 100% by weight, the polypropylene resin (A) is preferably not less than 3% by weight and not more than 50% by weight, more preferably not less than 5% by weight and not more than 50% by weight, and still more preferably not less than 10% by weight and not more than 45% by weight. The linear polypropylene resin (B) is preferably not less than 50% by weight and not more than 97% by weight, more preferably not less than 50% by weight and not more than 95% by weight, and still more preferably not less than 55% by weight and not more than 90% by weight. At a mixture ratio within the range above, a foam-injection-molded article having uniform and fine cells, an expansion ratio of not less than 2 times, and beautiful surface appearance without flow marks can be provided at low cost. At a mixture ratio outside the range above, for example, if the amount of the polypropylene resin (A) is less than 5% by weight, a foamed article having uniform and fine cells is less likely to be obtained; if the amount of the polypropylene resin (A) is more than 50% by weight, only a molded article having poor appearance with a lot of flow marks is more likely to be obtained.

The present invention also relates to a foam-injection-molded article, produced by foam injection molding a composition including the polypropylene resin or polypropylene resin composition and a foaming agent.

The foaming agent used in the present invention is not particularly limited, as long as it is any foaming agent usually used for foam injection molding, such as chemical foaming agents and physical foaming agents.

The chemical foaming agent is mixed with the resin in advance, fed to an extruder or an injection molding machine, and decomposed in a cylinder to generate gas such as carbon dioxide gas. Examples of the chemical foaming agent include inorganic chemical foaming agents such as sodium bicarbonate and ammonium carbonate, and organic chemical foaming agents such as azodicarbonamide and N,N'-dinitrosopentamethylenetetramine. These may be used alone, or two or more thereof may be used in admixture.

The physical foaming agent is injected in gas or supercritical fluid into the molten resin in a cylinder of an extruder or an injection molding machine, and dispersed or dissolved. After injected into the mold, the physical foaming agent functions as a foaming agent by pressure release. Examples of the physical foaming agent include aliphatic hydrocarbons such as propane and butane; alicyclic hydrocarbons such as cyclobutane and cyclopentane; halogenated hydrocarbons such as chlorodifluoromethane and dichloromethane; and inorganic gases such as nitrogen, carbon dioxide gas, and air. These may be used alone, or two or more thereof may be used in admixture.

Among these foaming agents, as those with which an ordinary extruder or injection molding machine can be safely used and which tend to provide uniform and fine cells, inorganic chemical foaming agents as the chemical foaming agents, and inorganic gases, such as nitrogen, carbon dioxide gas and air, as the physical foaming agents are preferred. In order to stably make the cells of the foam-injection-molded article uniform and fine, for example, a foaming aide such as organic acids (e.g. citric acid), or a nucleating agent such as fine inorganic particles (e.g. talc, lithium carbonate) may be added if necessary to such a foaming agent. In general, from the viewpoints of handleability, storage stability, and dispersibility into the polypropylene resin, the inorganic chemical foaming agent is preferably used as a master batch for a polyolefin resin in which the concentration of the foaming agent is 10 to 50% by weight.

The amount of the foaming agent to be used in the present invention may be appropriately set according to the expansion ratio of the final product, the kind of the foaming agent, and the resin temperature during molding. For example, in general, the inorganic chemical foaming agent is used in the range of preferably not less than 0.5 parts by weight and not more than 30 parts by weight, and more preferably not less than 1 part by weight and not more than 20 parts by weight based on 100 parts by weight of the polypropylene resin used in the present invention. If the inorganic chemical foaming agent is used in this range, a foam-injection-molded article having an expansion ratio of not less than 2 times and having uniform and fine cells tends to be obtained economically. The physical foaming agent is used and fed to an injection molding machine in the range of not less than 0.05 parts by weight and not more than 10 parts by weight, and preferably not less than 0.1 parts by weight and not more than 5 parts by weight based on 100 parts by weight of the polypropylene resin used in the present invention.

The polypropylene resin composition according to the present invention particularly has high fluidity such that the melt flow rate is more than 30 g/10 min, and can be greatly deformed by a small expanding force. Accordingly, a foam-injection-molded article having a desired expansion ratio is more likely to be obtained even if the amount of the foaming agent is reduced, compared to the conventional polypropylene resin having a melt flow rate of not more than 30 g/10 min. It should be noted that even if a resin composition having a melt flow rate of more than 30 g/10 min is used, the expansion ratio is reduced due to the loss of gas caused by breakage of cells. Therefore, it is an essential requirement that the polypropylene resin has a loss tangent (tan $\delta$) of not more than 6.0.

That is, it is only when the polypropylene resin composition according to the present invention is used that the amount of the foaming agent can be reduced. Reduction in the amount of the foaming agent leads to not only reduction in cost but also reduction in silver streaks, and is preferred from the viewpoint of economy and quality of the molded article.

In the present invention, other polypropylene resins not included in the scope of the present invention, high density polyethylene resins, high pressure low density polyethylene resins, linear low density polyethylene resins, ethylene-α-olefin copolymers, olefin elastomers, styrene elastomers, and other thermoplastic resins may be mixed as necessary to an extent that the effect of the present invention is not impaired.

Further, in the present invention, stabilizers such as antioxidants, metal deactivators, phosphorus process stabilizers, ultraviolet absorbing agents, ultraviolet stabilizers, fluorescent brighteners, metal soaps, and acid adsorbents; and additives such as crosslinking agents, chain transfer agents, nucleators, plasticizers, lubricants, fillers, reinforcing agents, pigments, dyes, flame retardants, and antistatic agents may be used together as necessary to an extent that the effect of the present invention is not impaired.

Next, the method for foam injection molding will be specifically described. As the foam injection molding method itself, a known method can be used. The molding conditions may be appropriately adjusted according to the melt flow rate of the polypropylene resin, the kind of the foaming agent, the kind of the molding machine, or the shape of the mold.

In the case of the polypropylene resin according to the present invention, molding is preferably performed under the conditions of, for example, a resin temperature of 170 to 250° C., a mold temperature of 10 to 100° C., a molding cycle of 1 to 120 minutes, an injection rate of 10 to 300 mm/sec, and an injection pressure of 10 to 200 MPa.

Moreover, there are various methods of foaming a resin within a mold. Among these, preferred is the so-called core back method (moving cavity method) which utilizes a mold consisting of a fixed mold and a movable mold that can be moved forward and backward to any position, and in which after injection is completed, the movable mold is moved backward to foam the resin. This is because a non-foamed layer is formed on the surface, and an inner foamed layer easily has uniform and fine cells, which tends to result in a very lightweight foam-injection-molded article. Regarding the method of moving the movable mold backward, the movable mold may be moved either in one step or in multiple steps including two or more steps. The backward movement speed may be appropriately adjusted.

In the present invention, the so-called counter pressure method is preferably used in combination, according to which pressure is applied in advance to the inside of a mold by an inert gas or the like, and the polypropylene resin composition is introduced into the mold. This is because the method can reduce surface appearance defects attributed to silver streaks. Thus, the foam-injection-molded article according to the present invention can be obtained.

The expansion ratio of the foam-injection-molded article according to the present invention is preferably not less than 2 times and not more than 10 times, and more preferably not less than 2.5 times and not more than 6 times. At an expansion ratio less than 2 times, a lightweight molded article is difficult to obtain. At an expansion ratio more than 10 times, rigidity is more likely to be remarkably reduced.

The use of the polypropylene resin according to the present invention enables easy production of a foam-injection-molded article having a projected area of not less than 0.2 m$^2$, and preferably not less than 0.23 m$^2$. The projected area used herein refers to the area when a foam-injection-molded article is projected on a plane perpendicular to the moving direction of a mold, and is a numerical value used as a basis for calculating the required clamping force during molding.

With regard to the impact resistance of the foam-injection-molded article according to the present invention, if the 50% breaking energy $E_{50}$ at −30° C. is not less than 1.0 J, this is satisfactory for practical purposes. The 50% breaking energy $E_{50}$ at −30° C. is preferably not less than 1.2 J.

EXAMPLES

Hereinafter, the present invention will be described more in detail by way of Examples, but the present invention is not limited to these Examples.

In Examples and Comparative Examples, test methods and determination criteria used in evaluations are as follows.

(1) Melt Flow Rate (MFR)

Using a Melt Indexer S-01 (manufactured by Toyo Seiki Seisaku-sho, Ltd.) in accordance with ASTM D-1238, the amount of resin extruded from a die for a predetermined period of time at 230° C. under a load of 2.16 kg was measured and used to calculate an amount of resin extruded for 10 minutes. Here, the predetermined period of time was for 60 seconds at a melt flow rate of not less than 3.5 g/10 min and less than 10 g/10 min; for 30 seconds at a melt flow rate of not less than 10 g/10 min and less than 25 g/10 min; for 15 seconds at a melt flow rate of not less than 25 g/10 min and less than 50 g/10 min; for 5 seconds at a melt flow rate of not less than 50 g/10 min and less than 100 g/10 min; for 3 seconds at a melt flow rate of not less than 100 g/10 min.

(2) Melt Tension (MT)

The melt tension was defined as the load measured as follows: using a Capirograph (manufactured by Toyo Seiki Seisaku-sho, Ltd.) which included a φ10 mm cylinder having an end with a φ1 mm orifice having a length of 10 mm and was equipped with an attachment for melt tension measurement, a strand discharged from a die when a piston was fallen at 200° C. and a piston fall speed of 10 mm/min, was connected to a pulley with a load cell located 350 mm below, and taken up at a speed of 1 m/min by the pulley; after the strand state was stabilized, the take-up speed was increased at a rate of 40 m/min$^2$; and a load applied to the pulley with a load cell when the strand was broken, was measured as the melt tension. In the case where the strand could not be broken, the load at which the load applied the pulley with a load cell was no longer increased by increasing the take-up speed, was regarded as the melt tension.

(3) Loss Tangent (tan δ)

Using a spacer having a thickness of 1.5 mm, a polypropylene resin was heat pressed at 190° C. for 5 minutes to prepare a press plate having a thickness of 1.5 mm. A specimen was punched out from the press plate with a φ25 mm punch. As a measurement apparatus, a viscoelasticity measuring apparatus ARES manufactured by TA Instruments was used and installed with a φ25 mm parallel plate fixture. A constant-temperature oven was equipped to enclose the fixture, and kept at 200° C. After the fixture was preheated, the constant-temperature oven was opened, and the φ25 mm specimen was inserted between the parallel plates. The constant-temperature oven was closed, and preheated for 5 minutes. Then, the parallel plate gap was reduced to 1 mm to compress the specimen. After the compression, the constant-temperature oven was opened again, and the excess resin was trimmed along the edges of the parallel plates with a brass spatula. The constant-temperature oven was closed, and the temperature was kept again for 5 minutes. Then, dynamic viscoelasticity measurement was started.

The measurement was performed at an angular frequency in the range of 0.1 rad/s to 100 rad/s. The storage modulus and loss modulus at each angular frequency, and a loss tangent (tan δ) value calculated therefrom were obtained. Among the results, the value of loss tangent (tan δ) at an angular frequency of 1 rad/s was used. Here, the measurement was performed at a strain of 5% under a nitrogen atmosphere.

(4) Injection Filling Properties

The number of short shots (the number of defects) when 20 consecutive shots were molded was determined, and evaluation was made on the following criteria.

A: the number of defects is 0;
F: the number of defects is 1 or more.

(5) Surface Appearance (Silver Streaks)

Silver streaks that appeared on the surface of a foam-injection-molded article were visually observed, and evaluation was made on the following criteria.

A: silver streaks are hardly noticeable;
B: silver streaks are not quite noticeable;
F: silver streaks are noticeable.

(6) Surface Appearance (Flow Marks)

Flow marks (circular pattern concentrically formed around the gate site) that appeared on the surface of a foam-injection-molded article were visually observed, and evaluation was made on the following criteria.

A: flow marks are not quite noticeable;
F: flow marks are noticeable.

(7) Expansion Ratio

The thickness of the bottom of a foam-injection-molded article was measured, and divided by the cavity clearance $t_0$ of the part of a clamped mold corresponding to that bottom. Thus, the expansion ratio was calculated.

(8) Internal Void

In the bottom of a foam-injection-molded article, a site 100 mm away from the gate site was cut in the thickness direction, and the cross section thereof was observed using a loupe. Based on the state of internal voids (large cells formed by the coalescence of cells), evaluation was made on the following criteria.

A: no internal void having a size of not less than 1.2 mm is found;
B: internal voids having a size of not less than 1.2 mm and less than 1.5 mm are found;
F: internal voids having a size of not less than 1.5 mm are found.

(9) Impact Resistance (Falling Ball Impact Test of Hard Plastics)

A 4 cm square specimen was cut out from the bottom surface of the obtained molded article, and the 50% breaking energy $E_{50}$ (units: J) at −30° C. was determined in accordance with JIS K7211-1 (1976).

Example 1

<Preparation of Modified Polypropylene Resin>

A mixture of 100 parts by weight of a propylene homopolymer having a melt flow rate of 45 g/10 min (manufactured by Prime Polymer Co., Ltd., J108M) as the linear polypropylene resin and 1.0 part by weight of t-butyl peroxyisopropylcarbonate as the radical polymerization initiator was fed from a hopper at a rate of 70 kg/h to a φ45 mm twin screw extruder (L/D=40). The mixture was melt kneaded at a cylinder temperature of 200° C. As the conjugated diene compound, 0.3 parts by weight (at a rate of 0.21 kg/h) of isoprene monomer was fed using a constant rate pump from a pressure injection port provided in the middle, and the resulting mixture was melt kneaded in the twin screw extruder to obtain pellets of a modified polypropylene resin.

Evaluation of the obtained modified polypropylene resin is shown in Table 1.

<Preparation of Foam-Injection-Molded Article>

To 100 parts by weight of the obtained modified polypropylene resin, 7.5 parts by weight of a sodium bicarbonate-based chemical foaming agent master batch [POLYSTYRENE EE275F manufactured by EIWA CHEMICAL IND. CO., LTD., the amount of gas generated by decomposition of 40 ml/g] as the foaming agent was added, and dry blended. Using an electric injection molding machine having a core back function [manufactured by UBE MACHINERY CORPORATION, LTD.] at a clamping force of 850 t, the obtained blend (resin composition containing the foaming agent) was melt kneaded at a cylinder temperature of 200° C. and a back pressure of 15 MPa. Then, the melt-kneaded blend was injected and filled at an injection rate of 100 mm/sec into a mold that included three valve gates (hot runners) set at 30° C.; consisted of a fixed mold and a movable mold movable forward and backward; and included a box cavity of 450 mm length, 550 mm width, and 100 mm height (projected area: 0.2475 $m^2$, vertical wall: inclination of 10 degrees, clearance of 2.5 mm, bottom: clearance $t_0$=1.3 mm), by using only one valve gate located in the center of the bottom surface. After injection and filling were completed, the movable mold was moved backward (core back) such that the expansion ratio was 3 times (thickness of the bottom: 3.9 mm), to foam the resin in the cavity. After foaming was completed, cooling was performed for 60 seconds, and a foam-injection-molded article was taken out.

Evaluation of the obtained foam-injection-molded article is shown in Table 2.

Example 2

<Preparation of Modified Polypropylene Resin>

A modified polypropylene resin was obtained in the same manner as in Example 1 except that the amount of t-butyl peroxyisopropylcarbonate blended was changed to 0.4 parts by weight, and the amount of isoprene fed was changed to 0.35 parts by weight.

<Preparation of Foam-Injection-Molded Article>

Injection foaming was performed in the same manner as in Example 1 to obtain a foam-injection-molded article. Evaluation of the obtained modified polypropylene resin is shown in Table 1, and evaluation of the foam-injection-molded article is shown in Table 2.

Example 3

<Preparation of Modified Polypropylene Resin>

A modified polypropylene resin was obtained in the same manner as in Example 1 except that the amount of t-butyl peroxyisopropylcarbonate blended was changed to 0.4 parts by weight, and the amount of isoprene fed was changed to 0.4 parts by weight.

<Preparation of Foam-Injection-Molded Article>

Injection foaming was performed in the same manner as in Example 1 to obtain a foam-injection-molded article.

Evaluation of the obtained modified polypropylene resin is shown in Table 1, and evaluation of the foam-injection-molded article is shown in Table 2.

Example 4

<Preparation of Modified Polypropylene Resin>

A modified polypropylene resin was obtained in the same manner as in Example 3.

<Preparation of Foam-Injection-Molded Article>

Injection foaming was performed in the same manner as in Example 3 except that the clearance $t_0$ in the cavity bottom was changed to 1.5 mm, and the movable mold was moved backward such that the expansion ratio was 3 times (thickness of the bottom: 4.5 mm). Thus a foam-injection-molded article was obtained.

Evaluation of the obtained modified polypropylene resin is shown in Table 1, and evaluation of the foam-injection-molded article is shown in Table 2.

Example 5

<Preparation of Modified Polypropylene Resin>

A modified polypropylene resin was obtained in the same manner as in Example 1.

<Preparation of Foam-Injection-Molded Article>

Injection foaming was performed in the same manner as in Example 1 to obtain a foam-injection-molded article, except that the amount of the foaming agent blended was changed to 6 parts by weight.

Evaluation of the obtained modified polypropylene resin is shown in Table 1, and evaluation of the foam-injection-molded article is shown in Table 2.

Example 6

<Preparation of Modified Polypropylene Resin>

A modified polypropylene resin was obtained in the same manner as in Example 1 except that the amount of t-butyl peroxyisopropylcarbonate blended was changed to 1.4 parts by weight, and the amount of isoprene fed was changed to 0.25 parts by weight.

<Preparation of Foam-Injection-Molded Article>

Injection foaming was performed in the same manner as in Example 5 to obtain a foam-injection-molded article.

Evaluation of the obtained modified polypropylene resin is shown in Table 1, and evaluation of the foam-injection-molded article is shown in Table 2.

Example 7

<Preparation of Modified Polypropylene Resin>

A modified polypropylene resin was obtained in the same manner as in Example 1 except that the amount of t-butyl peroxyisopropylcarbonate blended was changed to 1.4 parts by weight, and the amount of isoprene fed was changed to 0.22 parts by weight.

<Preparation of Foam-Injection-Molded Article>

Injection foaming was performed in the same manner as in Example 5 to obtain a foam-injection-molded article.

Evaluation of the obtained modified polypropylene resin is shown in Table 1, and evaluation of the foam-injection-molded article is shown in Table 2.

Example 8

<Preparation of Modified Polypropylene Resin>

A modified polypropylene resin was obtained in the same manner as in Example 1 except that the amount of t-butyl peroxyisopropylcarbonate blended was changed to 0.3 parts by weight, and the amount of isoprene fed was changed to 0.4 parts by weight.

<Preparation of Foam-Injection-Molded Article>
Injection foaming was performed in the same manner as in Example 4 to obtain a foam-injection-molded article.

Evaluation of the obtained modified polypropylene resin is shown in Table 1, and evaluation of the foam-injection-molded article is shown in Table 2.

Comparative Example 1

<Preparation of Modified Polypropylene Resin>
A modified polypropylene resin was obtained in the same manner as in Example 1 except that the amount of t-butyl peroxyisopropylcarbonate blended was changed to 0.6 parts by weight, and the amount of isoprene fed was changed to 0.8 parts by weight.
<Preparation of Foam-Injection-Molded Article>
Injection foaming was performed in the same manner as in Example 1 except that the clearance $t_0$ in the cavity bottom was changed to 1.5 mm, and the movable mold was moved backward such that the expansion ratio was 3 times (thickness of the bottom: 4.5 mm. Thus a foam-injection-molded article was obtained.

Evaluation of the obtained modified polypropylene resin is shown in Table 1, and evaluation of the foam-injection-molded article is shown in Table 2.

Comparative Example 2

<Preparation of Foam-Injection-Molded Article>
Injection foaming was performed in the same manner as in Example 1 except that a commercially available propylene homopolymer having a melt flow rate of 60 g/10 min was used instead of the modified polypropylene resin, and the movable mold was moved backward such that the expansion ratio was 1.4 times (thickness of the bottom: 1.8 mm). Thus a foam-injection-molded article was obtained.

Evaluation of the obtained foam-injection-molded article is shown in Table 2.

Comparative Example 3

<Preparation of Foam-Injection-Molded Article>
Injection foaming was performed in the same manner as in Comparative Example 1 except that a commercially available propylene homopolymer having a melt flow rate of 15 g/10 min was used instead of the modified polypropylene resin, and the movable mold was moved backward such that the expansion ratio was 1.6 times (thickness of the bottom: 2.4 mm). Thus a foam-injection-molded article was obtained.

Evaluation of the obtained foam-injection-molded article is shown in Table 2.

Comparative Example 4

<Preparation of Modified Polypropylene Resin>
A modified polypropylene resin was obtained in the same manner as in Example 1 except that the amount of t-butyl peroxyisopropylcarbonate blended was changed to 0.6 parts by weight, and the amount of isoprene fed was changed to 0.8 parts by weight.
<Preparation of Foam-Injection-Molded Article>
Injection foaming was performed in the same manner as in Comparative Example 1 to obtain a foam-injection-molded article, except that the amount of the foaming agent blended was changed to 6 parts by weight.

Evaluation of the obtained modified polypropylene resin is shown in Table 1, and evaluation of the foam-injection-molded article is shown in Table 2.

TABLE 1

| | Raw material composition of modified polypropylene resin | | | Physical properties of modified polypropylene resin | | |
|---|---|---|---|---|---|---|
| | Linear polypropylene resin (Parts by weight) | Conjugated diene compound (Parts by weight) | Radical polymerization initiator (Parts by weight) | MFR (g/10 min) | MT (cN) | tan δ |
| Example 1 Example 5 | PP-1 (100) | Isoprene (0.3) | PBI (1.0) | 56 | 4.8 | 2.5 |
| Example 2 | PP-1 (100) | Isoprene (0.35) | PBI (0.4) | 62 | 1.1 | 3.5 |
| Example 3 Example 4 | PP-1 (100) | Isoprene (0.4) | PBI (0.4) | 43 | 1.9 | 2.5 |
| Example 6 | PP-1 (100) | Isoprene (0.25) | PBI (1.4) | 175 | 1.9 | 4.4 |
| Example 7 | PP-1 (100) | Isoprene (0.22) | PBI (1.4) | 207 | 1.2 | 4.7 |
| Example 8 | PP-1 (100) | Isoprene (0.4) | PBI (0.3) | 35 | 1.3 | 5.2 |
| Comparative Example 1 Comparative Example 4 | PP-1 (100) | Isoprene (0.8) | PBI (0.6) | 6 | 12 | 1.3 |

TABLE 2

| | Polypropylene resin | | | Molding conditions | | Evaluation results of foam injection molding | | | |
|---|---|---|---|---|---|---|---|---|---|
| | MFR (g/10 min) | MT (cN) | tan δ | Amount of foaming agent (Parts by weight) | Clearance in bottom $t_0$ (mm) | injection filling properties | Silver streaks | Expansion ratio | Internal voids |
| Example 1 | 56 | 4.8 | 2.5 | 7.5 | 1.3 | A | B | 3 | A |
| Example 2 | 62 | 1.1 | 3.5 | 7.5 | 1.3 | A | B | 3 | A |
| Example 3 | 43 | 1.9 | 2.5 | 7.5 | 1.3 | F | B | 3 | A |
| Example 4 | 43 | 1.9 | 2.5 | 7.5 | 1.5 | A | B | 3 | A |

TABLE 2-continued

| | Polypropylene resin | | | Molding conditions | | Evaluation results of foam injection molding | | | |
|---|---|---|---|---|---|---|---|---|---|
| | MFR (g/10 min) | MT (cN) | tan δ | Amount of foaming agent (Parts by weight) | Clearance in bottom $t_0$ (mm) | injection filling properties | Silver streaks | Expansion ratio | Internal voids |
| Example 5 | 56 | 4.8 | 2.5 | 6 | 1.3 | A | A | 3 | A |
| Example 6 | 175 | 1.9 | 4.4 | 6 | 1.3 | A | A | 3 | A |
| Example 7 | 207 | 1.2 | 4.7 | 6 | 1.3 | A | A | 3 | A |
| Example 8 | 35 | 1.3 | 5.2 | 7.5 | 1.5 | A | B | 3 | B |
| Comparative Example 1 | 6 | 12 | 1.3 | 7.5 | 1.5 | F | B | 3 | A |
| Comparative Example 2 | 60 | <0.1 | 10.5 | 7.5 | 1.3 | A | F | 1.4 | F |
| Comparative Example 3 | 15 | 0.2 | 4.1 | 7.5 | 1.5 | F | F | 1.5 | F |
| Comparative Example 4 | 6 | 12 | 1.3 | 6 | 1.5 | F | A | 2.7 | A |

Since the polypropylene resin composition according to the present invention has excellent fluidity, even when a large mold having a projected area more than 0.2 m² was used, there tended to be fewer short shots in continuous molding, and excellent injection filling properties were shown. Moreover, the expansion ratio in the bottom of the foam-injection-molded article was 3 times and a molded article having a high expansion ratio was obtained. Silver streaks and flow marks on the surface of the foam-injection-molded article were not quite noticeable. Additionally, a foam-injection-molded article having improved impact resistance was obtained.

Particularly, in the case where the melt flow rate of the polypropylene resin was more than 50 g/10 min, even when the clearance $t_0$ in the cavity bottom was reduced to 1.3 mm, good injection filling properties were shown, and in spite of a high expansion ratio of 3 times, a thin foam-injection-molded article having a thickness less than 4 mm could be obtained.

In contrast, in the polypropylene resin of Comparative Example 1, short shots sometimes occurred in continuous molding even when the clearance $t_0$ in the cavity bottom was increased to 1.5 mm, and insufficient injection filling properties were shown. In the polypropylene resin of Comparative Example 2, although good injection filling properties were shown, silver streaks on the surface of the foam-injection-molded article were noticeable, and only a foam-injection-molded article having internal voids was obtained even at an expansion ratio of 1.4 times. In the polypropylene resin of Comparative Example 3, although the loss tangent (tan δ) was not more than 6.0 because of the low melt flow rate, only a foam-injection-molded article having internal voids was obtained even at an expansion ratio of 1.5 times. Moreover, silver streaks on the surface of the foam-injection-molded article were noticeable, and the injection filling properties were insufficient.

Additionally, the polypropylene resin according to the present invention achieved 3-fold expansion even when the amount of the foaming agent was reduced to 6 parts by weight. Moreover, a foam-injection-molded article in which silver streaks were hardly noticeable was obtained. In contrast, in the polypropylene resin of Comparative Example 4, when the amount of the foaming agent was reduced to 6 parts by weight, the expansion ratio of 3 times could not be obtained.

Production Examples

Modified polypropylene resins were produced under the following production conditions.

Production Example A-1

A mixture of 100 parts by weight of a propylene homopolymer having a melt flow rate of 45 g/10 min (manufactured by Prime Polymer Co., Ltd., J108M) as the linear polypropylene resin and 1.0 part by weight of t-butyl peroxyisopropylcarbonate as the radical polymerization initiator was fed from a hopper at a rate of 70 kg/h to a φ45 mm twin screw extruder (L/D=40), and melt kneaded at a cylinder temperature of 200° C. As the conjugated diene compound, 0.4 parts by weight (at a rate of 0.28 kg/h) of isoprene monomer was fed using a constant rate pump from a pressure injection port provided in the middle, and the resulting mixture was melt kneaded in the twin screw extruder to obtain pellets of a modified polypropylene resin.

Evaluation of the obtained modified polypropylene resin is shown in Table 3.

Production Example A-2

A modified polypropylene resin was obtained in the same manner as in Production Example A-1 except that the amount of t-butyl peroxyisopropylcarbonate blended was changed to 0.4 parts by weight, and the amount of isoprene fed was changed to 0.4 parts by weight.

Evaluation of the obtained modified polypropylene resin is shown in Table 3.

Production Example A-3

A modified polypropylene resin was obtained in the same manner as in Production Example A-1 except that the amount of t-butyl peroxyisopropylcarbonate blended was changed to 1.4 parts by weight, and the amount of isoprene fed was changed to 0.3 parts by weight.

Evaluation of the obtained modified polypropylene resin is shown in Table 3.

Production Example A-4

A modified polypropylene resin was obtained in the same manner as in Production Example A-1 except that the amount of t-butyl peroxyisopropylcarbonate blended was changed to 1.4 parts by weight, and the amount of isoprene fed was changed to 0.25 parts by weight.

Evaluation of the obtained modified polypropylene resin is shown in Table 3.

Production Example A-5

A modified polypropylene resin was obtained in the same manner as in Production Example A-1 except that the amount of t-butyl peroxyisopropylcarbonate blended was changed to 0.6 parts by weight, and the amount of isoprene fed was changed to 0.8 parts by weight.

Evaluation of the obtained modified polypropylene resin is shown in Table 3.

temperature of 200° C. and a back pressure of 15 MPa. Then, the melt-kneaded blend was injected and filled at an injection rate of 100 mm/sec into a mold that included three valve gates (hot runners) set at 30° C.; consisted of a fixed mold and a movable mold movable forward and backward; and included a box cavity of 450 mm length, 550 mm width, and 100 mm height (projected area: 0.2475 m$^2$, vertical wall: inclination of 10 degrees, clearance of 2.5 mm, bottom: clearance $t_0$=1.3 mm), by using only one valve gate located in the center of the bottom surface. After injection and filling were completed, the movable mold was moved backward (core back) such that the expansion ratio was 3 times (thickness of the bottom: 3.9 mm), to foam the resin in the cavity. After foaming was completed, cooling was performed for 60 seconds, and a foam-injection-molded article was taken out.

The evaluation result of the obtained foam-injection-molded article is shown in Table 4.

TABLE 3

| | Raw material composition of modified polypropylene resin | | | Physical properties of modified polypropylene resin | | |
|---|---|---|---|---|---|---|
| | Linear polypropylene resin (Parts by weight) | Conjugated diene compound (Parts by weight) | Radical polymerization initiator (Parts by weight) | MFR (g/10 min) | MT (cN) | tan δ |
| A-1 | PP-1 (100) | Isoprene (0.4) | PBI (1.0) | 56 | 4.8 | 2.5 |
| A-2 | PP-1 (100) | Isoprene (0.4) | PBI (0.4) | 43 | 1.9 | 2.5 |
| A-3 | PP-1 (100) | Isoprene (0.3) | PBI (1.4) | 97 | 1.9 | 3.6 |
| A-4 | PP-1 (100) | Isoprene (0.25) | PBI (1.4) | 175 | 1.9 | 4.4 |
| A-5 | PP-1 (100) | Isoprene (0.8) | PBI (0.6) | 6 | 12 | 1.3 |

As the linear polypropylene resin (B) and the polyolefin wax (C), the followings were used:
(B-1) a propylene homopolymer having a melt flow rate of 45 g/10 min, a melt tension of 0.7 cN, and a Charpy impact strength of 2.0 kJ/m$^2$ (manufactured by Prime Polymer Co., Ltd., J108M);
(B-2) a propylene-ethylene copolymer having a melt flow rate of 45 g/10 min, a melt tension of 0.8 cN, and a Charpy impact strength of 5.5 kJ/m$^2$ (manufactured by Prime Polymer Co., Ltd., J708UG); and
(C) a homopolymer polyethylene wax produced with a metallocene catalyst and having a molecular weight of 2300, a density of 900 kg/m$^3$, a softening point of 123° C., and a melting point of 105° C. (manufactured by Clariant (Japan) K.K., Licocene PE4201).

Examples 9 to 17

<Preparation of Polypropylene Resin Composition>

According to the kinds and composition ratio shown in Table 4, the modified polypropylene resin (A) was dry blended with the linear polypropylene resin (B) and a sodium bicarbonate-based chemical foaming agent master batch [manufactured by EIWA CHEMICAL IND. CO., LTD., POLYSTYRENE EE275F, the amount of gas generated by decomposition of 40 ml/g] as the foaming agent.

<Preparation of Foam-Injection-Molded Article>

Using an electric injection molding machine having a core back function [manufactured by UBE MACHINERY CORPORATION, LTD.] at a clamping force of 850 t, the obtained blend was melt kneaded under the conditions of a cylinder Comparative Examples 5 to 8 and 10

<Preparation of Polypropylene Resin Composition>

According to the kinds and composition ratio shown in Table 4, the modified polypropylene resin (A) was mixed and dry blended with the linear polypropylene resin (B), the polyolefin wax (C), and a sodium bicarbonate-based chemical foaming agent master batch [manufactured by EIWA CHEMICAL IND. CO., LTD., POLYSTYRENE EE275F, the amount of gas generated by decomposition of 40 ml/g] as the foaming agent.

<Preparation of Foam-Injection-Molded Article>

The obtained blend was injected and foamed in the same manner as in Example 1 to obtain a foam-injection-molded article.

Evaluation of the obtained foam-injection-molded article is shown in Table 4.

Comparative Example 9

Injection foaming was performed in the same manner as in Example 1 except that without using the modified polypropylene resin according to the present invention, only the linear polypropylene resin (B-2) was used. However, a foamed article having a uniform foam structure could not be obtained.

Comparative Example 11

Injection foaming was performed in the same manner as in Example 1 except that without using the linear polypropylene resin used in the present invention, only the modified polypropylene resin (A-1) was used.

Evaluation of the obtained foam-injection-molded article is shown in Table 4.

TABLE 4

| | Composition ratio (added amount: parts by weight) | | | | | | | | Evaluation results of foam injection molding | | | | |
|---|---|---|---|---|---|---|---|---|---|---|---|---|---|
| | Modified PP | | | | | Linear PP | | Wax | Amount of | Injection filling | Expansion | Silver | Flow | Impact |
| | A-1 | A-2 | A-3 | A-4 | A-5 | B-1 | B-2 | C | foaming agent | properties | ratio | streaks | marks | resistance |
| Example 9 | 30 | — | — | — | — | 70 | — | — | 7.5 | A | 3 | B | A | 0.7 |
| Example 10 | 5 | — | — | — | — | — | 95 | — | 7.5 | A | 3 | B | A | 1.0 |
| Example 11 | 30 | — | — | — | — | — | 70 | — | 7.5 | A | 3 | B | A | 1.4 |
| Example 12 | 20 | — | — | — | — | — | 80 | — | 7.5 | A | 3 | B | A | 1.5 |
| Example 13 | 50 | — | — | — | — | — | 50 | — | 7.5 | A | 3 | B | A | 1.2 |
| Example 14 | — | 30 | — | — | — | — | 70 | — | 7.5 | A | 3 | B | A | 1.5 |
| Example 15 | — | — | 30 | — | — | — | 70 | — | 7.5 | A | 3 | B | A | 1.3 |
| Example 16 | — | — | — | 30 | — | — | 70 | — | 7.5 | A | 3 | B | A | 1.2 |
| Example 17 | 20 | — | — | — | — | — | 80 | — | 6 | A | 3 | A | A | 1.5 |
| Comparative Example 5 | — | — | — | — | 30 | 70 | — | — | 7.5 | F | 3 | B | F | 0.8 |
| Comparative Example 6 | — | — | — | — | 30 | — | 70 | — | 7.5 | F | 3 | B | F | 1.2 |
| Comparative Example 7 | — | — | — | — | 30 | — | 70 | 8 | 7.5 | A | 3 | B | F | 1.0 |
| Comparative Example 8 | — | — | — | — | 30 | — | 70 | — | 6 | F | 2.5 | A | F | 1.2 |
| Comparative Example 9 | 0 | — | — | — | — | — | 100 | — | 7.5 | Foamed article was not obtained | | | | |
| Comparative Example 10 | 60 | — | — | — | — | — | 40 | — | 7.5 | A | 3 | B | F | 0.9 |
| Comparative Example 11 | 100 | — | — | — | — | — | — | — | 7.5 | A | 3 | B | F | 0.5 |

In the polypropylene resin composition of Comparative Example 5, short shots sometimes occurred in continuous molding because the fluidity of the modified polypropylene resin was insufficient, and therefore insufficient injection filling properties were shown. Although a foam-injection-molded article at a desired expansion ratio was obtained, flow marks on the surface were noticeable.

In the polypropylene resin composition of Comparative Example 6, although impact resistance was improved by the use of (B-2) as the linear polypropylene resin, only a molded article having poor injection filling properties and poor surface appearance was obtained similarly to the case of Comparative Example 1.

In the polypropylene resin composition of Comparative Example 7, in which the polyethylene wax was added to the composition of Comparative Example 6, the fluidity was improved more than that in Comparative Example 6 and sufficient injection filling properties were shown. By the addition of the polyethylene wax, however, the impact resistance of the molded article was reduced, and the surface appearance was not satisfactory.

In the polypropylene resin composition of Comparative Example 9, the resin composition itself exhibited no melt elasticity, and foam injection molding could not be carried out.

In the polypropylene resin composition of Comparative Example 11, although a foam-injection-molded article having a desired expansion ratio was obtained, flow marks on the surface were extremely noticeable.

The polypropylene resin composition according to the present invention, as in Example 17, achieved 3-fold expansion even when the amount of the foaming agent was reduced to 6 parts by weight, and also provided a foam-injection-molded article in which silver streaks were hardly noticeable. In contrast, in the polypropylene resin composition of Comparative Example 8, in which the amount of the foaming agent was reduced to 6 parts by weight, the expansion ratio of 3 times could not be obtained.

The invention claimed is:

1. A polypropylene resin, obtained by melt mixing a linear polypropylene resin, a radical polymerization initiator and a conjugated diene compound,
   wherein said polypropylene resin has a melt flow rate of more than 50 g/10 min and not more than 250 g/10 min as measured at 230° C. under a load of 2.16 kg; a melt tension at 200° C. of not less than 0.3 cN; and a loss tangent, tan δ, of not more than 6.0, the loss tangent being a ratio of loss modulus to storage modulus at an angular frequency of 1 rad/s in dynamic viscoelasticity measurement at 200° C.

2. The polypropylene resin according to claim 1,
   wherein the amount of the radical polymerization initiator added is not less than the amount of the conjugated diene compound added.

3. The polypropylene resin according to claim 2,
   wherein the amount of the radical polymerization initiator added is not less than 1.5 times the amount of the conjugated diene compound added.

4. A polypropylene resin composition for foam injection molding, comprising:
   3 to 50% by weight of a polypropylene resin; and
   50 to 97% by weight of a first linear polypropylene resin having a melt flow rate at 230° C. of not less than 10 g/10 min and not more than 150 g/10 min and a melt tension of less than 2 cN,
   wherein said polypropylene resin is obtained by melt mixing a second linear polypropylene resin, a radical polymerization initiator and a conjugated diene compound, and
   wherein said polypropylene resin has a melt flow rate of more than 30 g/10 min and not more than 250 g/10 min as measured at 230° C. under a load of 2.16 kg; a melt tension at 200° C. of not less than 0.3 cN; and a loss tangent, tan δ, of not more than 6.0, the loss tangent being a ratio of loss modulus to storage modulus at an angular frequency of 1 rad/s in dynamic viscoelasticity measurement at 200° C.

5. The polypropylene resin composition for foam injection molding according to claim 4,
wherein the first linear polypropylene resin has a Charpy impact strength at 23° C. of not less than 5 kJ/m$^2$.

6. An foam-injection-molded article, comprising:
a composition comprising a polypropylene resin or a polypropylene resin composition for foam injection molding, and
a foaming agent,
wherein said polypropylene resin composition for foam injection molding comprises
3 to 50% by weight of the polypropylene resin; and
50 to 97% by weight of a first linear polypropylene resin having a melt flow rate at 230° C. of not less than 10 g/10 min and not more than 150 g/10 min and a melt tension of less than 2 cN,
wherein said polypropylene resin is obtained by melt mixing a second linear polypropylene resin, a radical polymerization initiator and a conjugated diene compound, and
wherein said polypropylene resin has a melt flow rate of more than 30 g/10 min and not more than 250 g/10 min as measured at 230° C. under a load of 2.16 kg; a melt tension at 200° C. of not less than 0.3 cN; and a loss tangent, tan δ, of not more than 6.0, the loss tangent being a ratio of loss modulus to storage modulus at an angular frequency of 1 rad/s in dynamic viscoelasticity measurement at 200° C., and
wherein said foam-injection molded article is produced by foam injection molding said composition.

7. The polypropylene resin according to claim 4,
wherein the melt flow rate is more than 50 g/10 min and not more than 250 g/10 min.

8. The polypropylene resin according to claim 4,
wherein the amount of the radical polymerization initiator added is not less than the amount of the conjugated diene compound added.

9. The polypropylene resin according to claim 8,
wherein the amount of the radical polymerization initiator added is not less than 1.5 times the amount of the conjugated diene compound added.

10. The polypropylene resin according to claim 5,
wherein the melt flow rate is more than 50 g/10 min and not more than 250 g/10 min.

11. The polypropylene resin according to claim 5,
wherein the amount of the radical polymerization initiator added is not less than the amount of the conjugated diene compound added.

12. The polypropylene resin according to claim 11,
wherein the amount of the radical polymerization initiator added is not less than 1.5 times the amount of the conjugated diene compound added.

13. The polypropylene resin according to claim 6,
wherein the melt flow rate is more than 50 g/10 min and not more than 250 g/10 min.

14. The polypropylene resin according to claim 6,
wherein the amount of the radical polymerization initiator added is not less than the amount of the conjugated diene compound added.

15. The polypropylene resin according to claim 14,
wherein the amount of the radical polymerization initiator added is not less than 1.5 times the amount of the conjugated diene compound added.

* * * * *